US010423635B2

(12) United States Patent
Chen et al.

(10) Patent No.: US 10,423,635 B2
(45) Date of Patent: Sep. 24, 2019

(54) PROCESSING TIME SERIES

(71) Applicant: International Business Machines Corporation, Armonk, NY (US)

(72) Inventors: Xiao Yan Chen, Beijing (CN); Yao Liang Chen, Shanghai (CN); Sheng Huang, Shanghai (CN); Kai Liu, Beijing (CN); Wei Lu, Beijing (CN); Lin Hao Xu, Beijing (CN); Xiao Min Xu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

(21) Appl. No.: 14/721,042

(22) Filed: May 26, 2015

(65) Prior Publication Data

US 2015/0347568 A1 Dec. 3, 2015

(30) Foreign Application Priority Data

May 30, 2014 (CN) .......................... 2014 1 0240668

(51) Int. Cl.
*G06F 16/248* (2019.01)
*G06F 16/28* (2019.01)
(Continued)

(52) U.S. Cl.
CPC ........ *G06F 16/248* (2019.01); *G06F 16/2477* (2019.01); *G06F 16/287* (2019.01); *G06F 17/18* (2013.01); *G06K 9/00496* (2013.01)

(58) Field of Classification Search
CPC ......... G06F 17/30554; G06F 17/30551; G06F 17/18; G06F 17/30601; G06F 19/22;
(Continued)

(56) References Cited

U.S. PATENT DOCUMENTS 5,664,174 A * 9/1997 Agrawal ........... G06F 17/30548
6,496,817 B1 * 12/2002 Whang ............ G06F 17/30985
(Continued)

FOREIGN PATENT DOCUMENTS

CN 102880621 A 1/2013
CN 103020643 A 4/2013
(Continued)

OTHER PUBLICATIONS

Jesus A. Gonzalez, A Review of Subsequence Time Series Clustering, Department of Information Systems, Faculty of Computer Science and Information Technology, University of Malaya (UM), 2014, all pages (Year: 2014).*
(Continued)

*Primary Examiner* — Jay A Morrison
*Assistant Examiner* — Antonio J Caiado
(74) *Attorney, Agent, or Firm* — Cantor Colburn LLP; Grant Johnson

(57) ABSTRACT

A method for processing a time series includes dividing, with a processing device, the time series into a plurality of windows by time; extracting at least one group of similar subsequences from a current window among the plurality of windows; and updating a candidate list on the basis of comparison between similar subsequences in each group of the at least one group with k characteristic subsequences in the candidate list; wherein the k characteristic subsequences are k characteristic subsequences with a greatest number of occurrences in at least processed parts of the time series.

8 Claims, 8 Drawing Sheets

300
310 Time Series
312 Window
314 Window
a Divide
c Slide
318
316 Group 1 of Similar Subsequences
Group N
b Compare & Update
Characteristic Subsequence 1
...
Characteristic Subsequence k
320 Candidate List

(51) Int. Cl.
*G06F 16/2458* (2019.01)
*G06F 17/18* (2006.01)
*G06K 9/00* (2006.01)

(58) Field of Classification Search
CPC ......... G06F 17/30985; G06F 17/30321; G06F 17/3033; G06F 17/30864; G06F 17/30548; G06F 17/30; G06F 16/248; G06F 16/287; G06F 16/2477; G06K 9/00496
USPC ........ 707/722, 693, 746, 759, 769; 600/309; 395/600, 606, 605
See application file for complete search history.

(56) References Cited

U.S. PATENT DOCUMENTS 6,532,456 B1* 3/2003 Wang ................. G06K 9/00536 706/48
6,718,317 B1* 4/2004 Wang ................. G06K 9/00536 706/50
7,739,052 B2 6/2010 Parida
7,945,570 B2 2/2011 Papadimitriou et al.
7,996,073 B2* 8/2011 Busche ................ A61B 5/0452 600/507
2003/0097356 A1* 5/2003 Lee ....................... G06F 16/283
2003/0130996 A1* 7/2003 Bayerl .............. G06F 17/30988
2005/0114298 A1* 5/2005 Fan ................... G06F 17/30327
2005/0235356 A1* 10/2005 Wang .................. G06F 16/2477 726/22
2006/0151621 A1* 7/2006 Ladas ................. G06F 3/03545 235/494
2008/0170507 A1* 7/2008 Handley ............. G06F 11/0733 370/242
2008/0181097 A1* 7/2008 Goldberg ........... H04B 1/71637 370/210
2009/0132457 A1* 5/2009 Brandenburg ...... G06F 11/3495 706/48
2009/0292706 A1* 11/2009 Ishimoto ........... G06F 17/30362
2010/0121793 A1* 5/2010 Fujimaki ............ G06K 9/00536 706/12
2011/0119100 A1* 5/2011 Ruhl ................... G06F 17/3089 705/7.11
2011/0178615 A1* 7/2011 Serra Julia ............. G10L 25/51 700/94
2011/0214554 A1* 9/2011 Nakadai ................. G09B 15/02 84/477 R
2012/0173547 A1* 7/2012 Suntinger ......... G06F 17/30985 707/749
2012/0330566 A1* 12/2012 Chaisson ................ G06F 19/22 702/20
2012/0330931 A1* 12/2012 Nakano .............. G05B 23/0283 707/722
2013/0024170 A1* 1/2013 Dannecker .............. G06F 17/18 703/2
2013/0103657 A1* 4/2013 Ikawa ............... G06F 16/90344 707/693
2013/0110753 A1 5/2013 Hao et al.
2014/0039274 A1* 2/2014 Sarrafzadeh .......... A61B 5/1118 600/300
2014/0149466 A1* 5/2014 Sato .................. G06F 17/30289 707/803
2014/0195474 A1* 7/2014 Anguera Miro ........ G10L 15/12 706/48
2014/0297685 A1* 10/2014 Nojima ............. G06F 17/30312 707/769
2015/0056619 A1* 2/2015 Li ........................... C12Q 1/68 435/6.11
2015/0178286 A1* 6/2015 Dhollander ......... G06F 17/3053 707/728
2015/0253366 A1* 9/2015 Agarwal ................ G01R 13/00 702/71

FOREIGN PATENT DOCUMENTS

CN 103197983 A 7/2013
GB 2485695 A * 5/2012

OTHER PUBLICATIONS

Argyros et al., Efficient Subsequence Matching in Time Series Databases Under Time and Amplitude Transformations, School of Electrical and Computer Engineering National Technical University of Athens, 2003, All pages. (Year: 2003).*
Goldin, et al., In Search of Meaning for Time Series Subsequence Clustering: Matching Algorithms Based on a New Distance Measure, CIKM'06, 2006, all pages. (Year: 2006).*
List of IBM Patents or Patent Applications Treated as Related: CN920140042US1, Date Filed: May 26, 2015, pp. 1-2.
Xiao Yan Chen, et al., "Processing Time Series," U.S. Appl. No. 14/748,295, filed Jun. 24, 2015.
A. Mueen, "Time Series Motif Discovery: Dimensions and Applications," Wiley Interdisciplinary Reviews: Data Mining and Knowledge Discovery, vol. 4, Mar./Apr. 2014, pp. 152-159.
A. Mueen, et al., "Online Discovery and Maintenance of Time Series Motifs," Proceedings of the 16th ACM SIGKDD international conference on Knowledge discovery and data mining, Jul. 25-28, 2010, pp. 1-10.
E. Fuchs, et al., "On-line motif detection in time series with SwiftMotif," Pattern Recognition, vol. 42, Issue 11, Nov. 2009, pp. 3015-3031.
P. Patel et al.,"Mining motifs in massive time series databases," Proceedings of the IEEE International Conference on Data Mining, 2002, pp. 1-8.
Hoang Thanh Lam, et al., "Online discovery of top-k similar motifs in time series data," Proceedings of the eleventh SIAM international conference on data mining, Apr. 28-30, 2011, pp. 1-12.

* cited by examiner

Fig. 5

PROCESSING TIME SERIES

FOREIGN PRIORITY

This application claims priority to Chinese Patent Application No. 201410240668.3, May 30, 2014, and all the benefits accruing therefrom under 35 U.S.C. § 119, the contents of which in its entirety are herein incorporated by reference.

BACKGROUND

Various embodiments of the present invention relate to time series, and more specifically, to a method and apparatus for processing time series.

With the development of technologies such as computer, data communication and real-time monitoring, time series databases have been applied in various aspects such as equipment monitoring, production line management, and financial analysis. A time series refers to a set of measured values arranged in time order. Here, a node storing measured values may be referred to as a data point or data event. A time series database refers to a database for storing these measured values. Measured values may include various data. For example, in an application environment of monitoring bridge security, collected data may include pressure data and/or pressure intensity data collected by a certain sensor; in an application environment of weather forecasting, collected data may include temperature, humidity, pressure, wind force (e.g., including direction and magnitude), etc.

Similarly, the term "search" refers to searching for similar subsequences in a time series. Typically, a time series consists of massive data, and the time series might be continuously updated in real time by incoming measured values. For example, in the application environment of monitoring bridge security, tens of thousands of sensors might be deployed on the bridge to measure pressure at each location in real time. When the database is updated with a frequency of 1 second or even shorter, large amounts of data will be generated.

It should be noted that a similarity search does not require subsequences to completely match with one another but may involve some difference. For example, an error bound may be "e." An important aspect of similarity search is to search for a motif in a time series. In short, a motif refers to a time series subsequence with a length of m that appears at least s times in the time series with the error bound e. In a time series database, motifs are an important basis for post processing (e.g., obtaining an association rule, clustering, classification, etc.).

So far there have been developed technical solutions for accelerating a similarity search. In these technical solutions, however, there exist a lot of drawbacks, as a collected time series cannot be processed in real time due to a large data amount or as only a time series in sliding window scope with a limited length can be processed in real time. Therefore, it becomes a research focus in the time series database field regarding how to search in a time series with a soaring data amount, for example, how to find top-k (a concrete value of k may be specified) motifs with the largest count of occurrences.

SUMMARY

In one aspect, a method for processing a time series includes dividing, with a processing device, the time series into a plurality of windows by time; extracting at least one group of similar subsequences from a current window among the plurality of windows; and updating a candidate list on the basis of comparison between similar subsequences in each group of the at least one group with k characteristic subsequences in the candidate list; wherein the k characteristic subsequences are k characteristic subsequences with a greatest number of occurrences in at least processed parts of the time series.

In another aspect, an apparatus for processing a time series, includes a dividing module configured to divide the time series into a plurality of windows by time; an extracting module configured to process a current window among the plurality of windows by extracting at least one group of similar subsequences from the current window; and an updating module configured to update a candidate list on the basis of comparison between similar subsequences in each group of the at least one group with k characteristic subsequences in the candidate list; wherein the k characteristic subsequences are k characteristic subsequences with a greatest number of occurrences in at least processed parts of the time series.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 shows a schematic view of a node in a candidate list according to one embodiment of the present invention;

DETAILED DESCRIPTION

Figure 1:
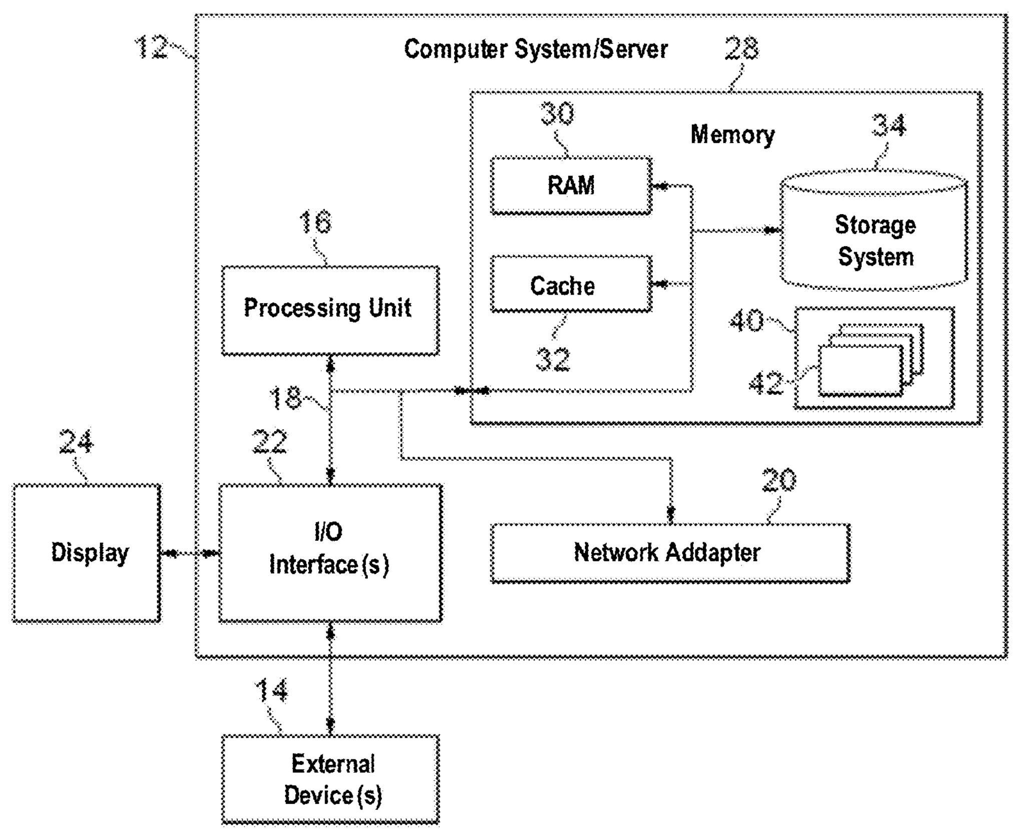
FIG. 1 schematically shows an exemplary computer system/server which is applicable to implement the embodiments of the present invention.

Therefore, it is desired to develop a technical solution capable of efficiently processing a time series, and it is desired to develop a technical solution capable of efficiently searching in a time series. Further, it is desired these technical solutions can conduct processing and search in real time as the time series is updated.

According to one aspect of the present invention, there is provided a method for processing a time series, including dividing the time series into a plurality of windows by time, extracting at least one group of similar subsequences from a current window among the plurality of windows; and updating a candidate list on the basis of comparison between similar subsequences in each group of the at least one group with k characteristic subsequences in the candidate list, wherein the k characteristic subsequences are k characteristic subsequences with the greatest number of occurrences in at least processed parts of the time series.

According to one aspect of the present invention, there is provided an apparatus for processing a time series, including a dividing module configured to divide the time series into a plurality of windows by time; an extracting module configured to process a current window among the plurality of windows by extracting at least one group of similar subsequences from the current window; and an updating module configured to update a candidate list on the basis of comparison between similar subsequences in each group of the at least one group with k characteristic subsequences in the candidate list, wherein the k characteristic subsequences are k characteristic subsequences with the greatest number of occurrences in at least processed parts of the time series.

In one embodiment of the present invention, there is provided a method for searching in a time series, including in response to receiving a search request, returning a candidate list as a search result, wherein the candidate list is a candidate list in the method of the present invention.

In one embodiment of the present invention, there is provided an apparatus for searching in a time series, including a searching module configured to, in response to receiving a search request, return a candidate list as a search result, wherein the candidate list is a candidate list in the apparatus of the present invention.

By means of the methods and apparatuses of the present invention, the computation complexity during search can be reduced greatly and further efficient search achieved.

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
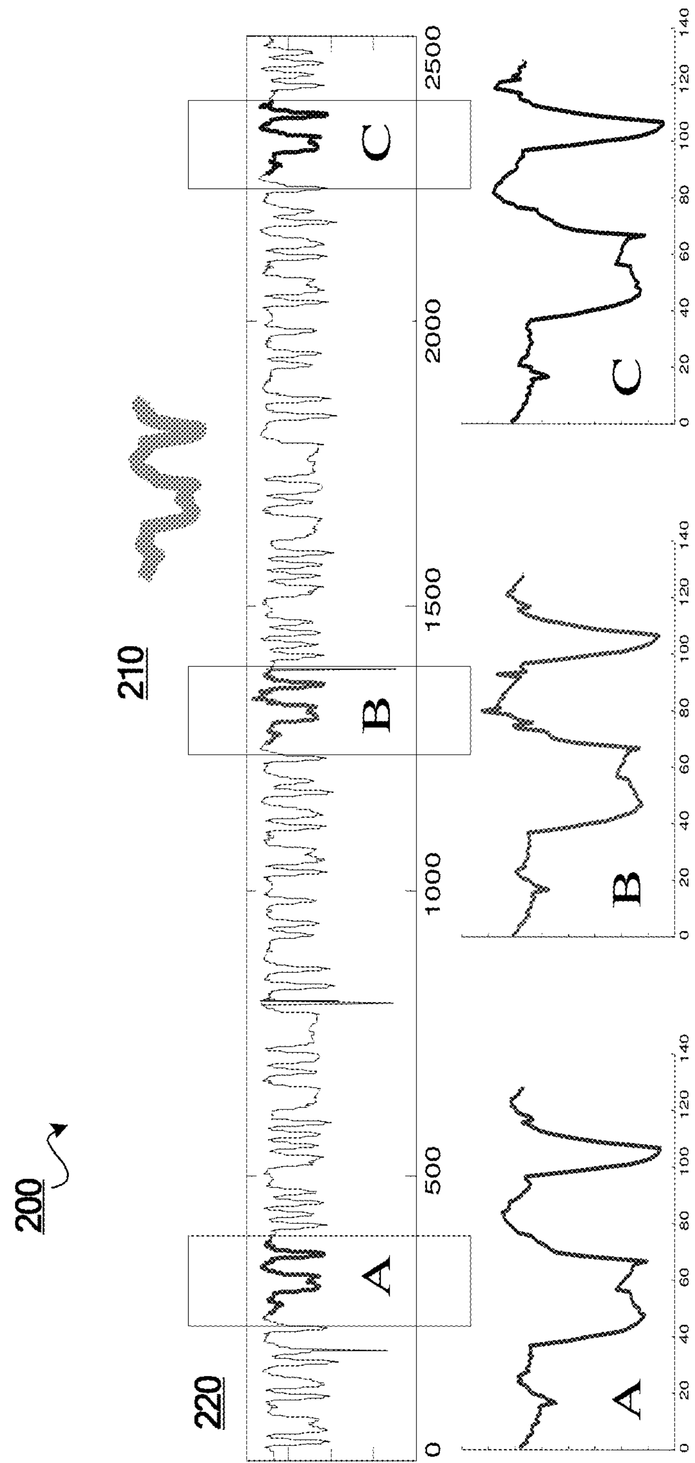
FIG. 2 shows a schematic view of searching in a time series.

FIG. 2 shows a schematic view 200 of searching in a time series database. This figure shows a time series 220 in a time series database, time series 220 representing meteorological data that is collected in past 2500 hours. In context, a subsequence A, a subsequence B and a subsequence C have the same length, and it is satisfied a difference among them is within the error bound e. Therefore, subsequences A, B and C may be referred to as motifs. In one technical solution, a subsequence 210 may further be obtained by averaging subsequences A, B and C. At this point, a difference between subsequence 210 and subsequences A-C is also maintained at a level not higher than e, so subsequence 210 may also be referred to as a motif. For the purpose of description, subsequence 210 may be referred to as a characteristic subsequence. In a search operation, subsequently, other subsequences in time series 220 may be compared with characteristic subsequence 210 to obtain more motifs.

The length of the time series shown in FIG. 2 is rather short, and only 3 subsequences are returned during search. When searching in a larger or super-large time series (e.g., meteorological data in the recent 5 years), a huge computation workload will be caused.

Technical solutions for searching for motifs in a time series have been proposed so far. Typically existing technical solutions may be divided into offline search and online search. Offline search refers to search in a time series in a past specific time period (e.g., the past week), at which point the number of data points in the time series is constant; online search refers to search in a time series collected in real time, whereupon data points in the time series are updated in real time as time changes.

Although a variety of search solutions have been proposed, these technical solutions contain drawbacks in different respects. Specifically, offline search includes the following algorithms for example: (1) Brute-Force algorithm: this algorithm can find motifs with a length of m from N subsequences in a time series, whereas the computation complexity ($N^2m$) of this technical solution is considerably huge and thus is not suitable to search in a time series with a great length. (2) Clustering algorithm: this algorithm can map a subsequence with a length of m to an m-dimensional space, obtain a core of each cluster in the m-dimensional space and further obtain a motif, whereas the computation complexity of this algorithm is also huge, for example it takes about 80 hours to process data of 2 GB.

Online searching includes the following algorithms, for example: (1) oMotif algorithm proposed by Abdullah, et al.: this algorithm can only find motifs that have appeared 2 times but cannot find top-k motifs with the largest count of occurrences in a time series. (2) kMotif proposed by Hoang, et al.: this algorithm can achieve online search, whereas data is searched for only within a current time window (e.g., with a length of w), and thus this algorithm does not satisfy a need to search in a time series with a length greater than w.

In view of these drawbacks in the foregoing technical solutions, it is desired to develop a method for efficiently searching for motifs in a time series, and it is desired the search method can not only search in a time series in a past specific time period (offline mode) but also search in a time series collected in real time (online mode).

It is noted that to limit the computation workload, a concrete value of the length m of a motif may be specified, and in the context of the present invention a discussion is only given to a search for motifs with a length of m. On the basis of the principle described in the present invention, those skilled in the art may further search for motifs with an increasing length (e.g., with an increment of 1 or other value) in a plurality of rounds, so as to obtain motifs with various lengths.

Figure 3:
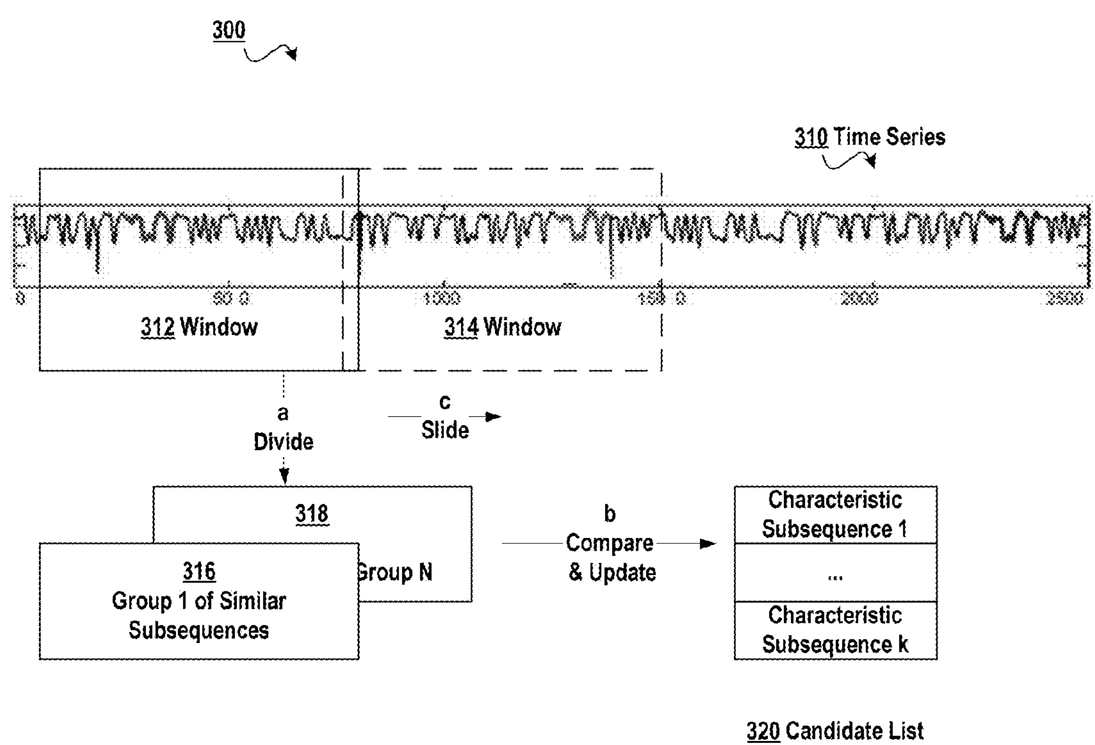
FIG. 3 schematically shows an architecture diagram of a technical solution for processing a time series according to one embodiment of the present invention.

To this end, embodiments of the present invention provide a technical solution for searching in a time series. Specifically, FIG. 3 schematically shows an architecture diagram 300 of a technical solution for processing a time series according to one embodiment of the present invention. As shown in this figure, top-k motifs with most occurrences need to be found in a time series 310.

As shown in FIG. 3, time series 310 may be divided into a plurality of windows by time on the basis of the principle of a sliding window, and the part of time series 310 within each window is processed one after another. Specifically, data within a window 312 may be divided into a plurality of subsequences each having a length of m on the basis of the length m of a motif, and similar subsequences are allocated to the same group (as shown by an arrow a) on the basis whether the plurality of subsequences are similar or not, so as to form a plurality of groups (e.g., a group 1 316, . . . , a group N 318). Subsequently, various groups are compared with corresponding characteristic subsequences 1, . . . , k in a candidate list 320 to update candidate list 320 (as shown by an arrow b).

In this embodiment, initially candidate list 320 may be empty and filled with various characteristic subsequences extracted from group 1 314 to group N 316 respectively. Subsequently, candidate list 320 may be updated on the basis of the comparison, so that characteristic subsequences extracted from those processed parts of time series 310 are kept in candidate list 320, such as characteristic subsequence 1, . . . , characteristic subsequence k with most occurrences in time series 310.

Specifically, when the processing to the part of time series 310 within window 312 has been completed, the window may slide ahead (e.g., slides to a window 314 as shown by an arrow c), and the above processing is repeated so that various parts of time series 310 are processed in chronological order. When processing data in various windows, since candidate list 320 may be continuously updated through comparison, and it may be ensured characteristic subsequences (e.g., k) with most occurrences extracted from processed data are kept in candidate list 320, k motifs with most occurrences can be conveniently searched for in time series 310.

In this embodiment, since the window can continuously slide ahead as time elapses, it is not necessary to limit whether time series 310 is an offline time series or an online time series, and further various embodiments of the present invention may be applicable to both offline mode and online mode.

On the basis of the principle shown in FIG. 3, one embodiment of the present invention proposes a method for processing a time series, comprising: dividing the time series into a plurality of windows by time, performing following steps to a current window among the plurality of windows: extracting at least one group of similar subsequences from the current window; and updating a candidate list on the basis of comparison between similar subsequences in each group of the at least one group with k characteristic subsequences in the candidate list, wherein the k characteristic subsequences are k characteristic subsequences with the greatest count of occurrences in at least processed parts of the time series.

Figure 4:
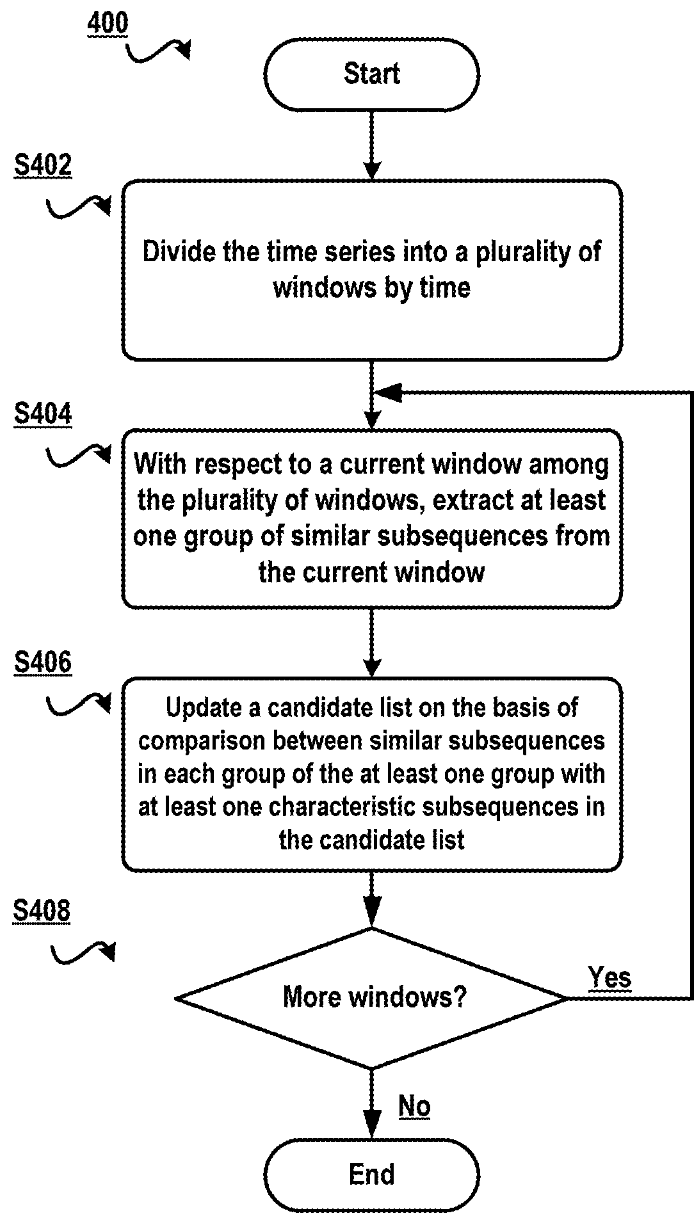
FIG. 4 schematically shows a flowchart of a method for processing a time series according to one embodiment of the present invention.

FIG. 4 schematically shows a flowchart 400 of a method for processing a time series according to one embodiment of the present invention. In operation S402, the time series is divided into a plurality of windows by time. Since the computation workload of a search might significantly increase with the increase of the length of a to-be-processed time series, the to-be-processed time series may be divided into a plurality of windows by time, and processing is only performed to data within one window in each round. Thereby, it may be ensured that in each round the amount of to-be-processed data may be kept within controllable scope so as to improve the search efficiency.

Specifically, suppose in the application environment of monitoring bridge security, pressure data in each position of the bridge is collected with a frequency of 1 time per second, and it is desired to search in a time series containing data in the past 30 days, then a time series containing 3600×24×30 time points needs to be processed where the time series data is not divided. Such a search will produce a huge calculation workload, and it is impossible to obtain a search result in a desired time period. By means of the technical solution of the present invention, for example, the window size is set as 1 day, and then the 30-day time series may be divided into 30 windows. At this point, a time series containing only 3600×24 time points needs to be processed in each round. Therefore, the computation complexity can be reduced greatly, and further the search efficiency can be improved.

Note in this embodiment, the window length w should be greater than the motif's length m, so that a plurality of subsequences with a length of m can be obtained from the time window within the window in a subsequent operation.

In operation S404, with respect to a current window among the plurality of windows, processing is performed as below: extracting from the current window at least one group of similar subsequences. In this operation, similar subsequences refer to subsequences with a length of m and satisfying a predefined similarity rule. Those skilled in the art may specify the similarity rule on the basis of needs of a concrete application environment (e.g., a difference is less than e).

Where data in the current window is divided into a plurality of subsequences with a length of m, those skilled in the art may allocate subsequences satisfying the similarity rule among the plurality of subsequences to the same group. Since processing is performed to data within only one window in this operation, the number of to-be-processed subsequences is not large, and it may not be limited how various groups are obtained. For example, any one of the foregoing Brute-Force algorithm, clustering algorithm, oMotif algorithm and kMotif algorithm may be used for obtaining groups, and it is ensured all subsequences in each group satisfy the predefined similarity rule.

In operation S406, a candidate list is updated on the basis of comparison between similar subsequences in each group of the at least one group with k characteristic subsequences in the candidate list, wherein the k characteristic subsequences are k characteristic subsequences with the greatest count of occurrences in at least processed parts of the time series.

In this operation, each time similar subsequences in a group are compared with each characteristic subsequence in the candidate list, and characteristic subsequences of similar subsequences with more occurrences in at least processed parts of the time series are updated to the candidate list, so that it is ensured that the k characteristic subsequences in the candidate list are always k characteristic subsequences with the greatest count of occurrences in the at least processed parts of the time series.

In operation S408, it is judged whether or not there exist more windows; if yes, the current window slides to a next window and the processing flow returns to operation S404, otherwise the processing flow ends. In this manner, as the sliding window slides gradually, parts of the time series within each window may be processed one after another, and further the entire time series is traversed. After traversing the entire time series, the k characteristic subsequences in the candidate list are those with the greatest count of occurrences in the entire time series.

By means of operations S402 to S408 shown in FIG. 4, the parts of the time series within various windows may be serially processed in multiple rounds, so that the computation workload that used to increase greatly with the length of the to-be-processed time series is reduced to a lower order of magnitude, the time series is managed efficiently, and further a basis is provided for subsequent operations like post analysis of the time series. For example, an object of searching in a longer time series can be achieved on the basis of the candidate list.

Continuing the foregoing example, when searching in a time series containing data in last 30 days, the computation complexity when using the above Brute-Force algorithm is O1 where the window is not divided, and the computation complexity when using the Brute-Force algorithm to process data within each window is O2, and then $$\frac{O2}{O1} = \frac{(3600*24*30)^2*m}{(3600*24)^2*m*30} = \frac{900}{30} = \frac{30}{1}.$$

Apparently, due to the technical solution of the present invention, the computation complexity can be reduced greatly, and in turn the search efficiency increased. When using other algorithm, those skilled in the art may obtain corresponding computation complexity likewise.

In one embodiment of the present invention, the extracting at least one group of similar subsequences from the current window comprises: adding two similar subsequences to the same group in response to a distance between the two similar subsequences being no greater than a threshold distance. As described above, groups may be obtained on the basis of a predefined similarity rule. In one embodiment, whether to add two subsequences to the same group may be determined on the basis whether a distance between the two subsequences is greater than a threshold distance.

Different threshold distances may be set on the basis of an application environment's requirements on similarity. Specifically, the threshold distance may be denoted in absolute or relative form, or further the threshold distance may be denoted on the basis of other distance-associated function.

In one embodiment, the distance is calculated on the basis of a difference in data at corresponding time points of the two similar subsequences. Since a subsequence with a length of m may be represented by an m-dimensional vector, a distance between two m-dimensional vectors may be used as a distance between two subsequences, for example, represented by a Euclidean distance. Specifically, suppose two m-dimensional subsequences are represented as $A_1=(a_1, \ldots, a_m)$ and $B_1=(b_1, \ldots, b_m)$, then at this point $a_1$ and $b_1$ are corresponding time points, and $a_m$ and $b_m$ are corresponding time points. When using the Euclidean distance as an equation for distance calculation, a distance between two subsequences may be represented as $Dis=\sqrt{(a_1-b_1)^2+\ldots+(a_m-b_m)^2}$.

Figure 5:
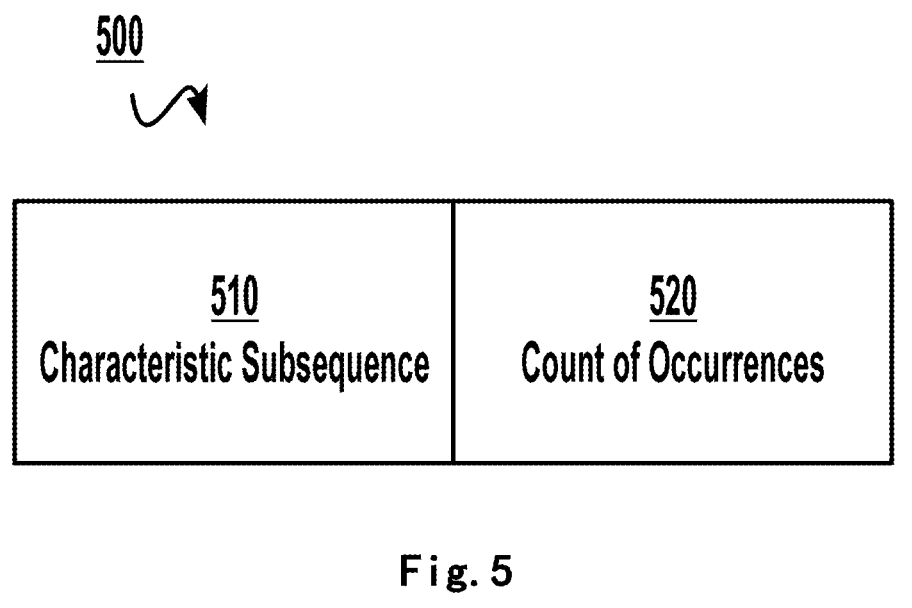

In one embodiment of the present invention, the candidate list further comprises corresponding counts of occurrences of the k characteristic subsequences, and the updating the candidate list on the basis of comparison between similar subsequences in each group of the at least one group with k characteristic subsequences in the candidate list comprises: updating the candidate list on the basis of the comparison and the corresponding counts of occurrences. Specifically, nodes in the candidate list may be represented using a data structure as shown in FIG. 5. This figure shows a schematic view 500 of a node in the candidate list according to one embodiment of the present invention. As shown in FIG. 5, the node in the candidate list may comprise two fields: a characteristic subsequence 510 and the count 520 of occurrences of characteristic subsequence 510. In various embodiments of the present invention, various approaches may be used to obtain characteristic subsequences. Briefly, a characteristic subsequence in a group may be obtained by averaging various similar subsequences in the group.

Continuing the foregoing example, suppose a group includes two subsequences $A_1=(a_1, \ldots, a_m)$ and $B_1=(b_1, \ldots, b_m)$ that are represented as m-dimensional vectors, then the group's characteristic subsequence may be represented as $$M=\left(\frac{a_1+b_1}{2}, \ldots, \frac{a_m+b_m}{2}\right).$$

At this point, the count of occurrences of this characteristic subsequence is 2. Those skilled in the art may further obtain a characteristic subsequence of a group including n similar subsequences on the basis of the foregoing principle, at which point the count of occurrences of the characteristic subsequence is n.

In one embodiment of the present invention, the updating the candidate list on the basis of the comparison and the corresponding counts of occurrences comprises: with respect to a current group of the at least one group, extracting a characteristic subsequence of the current group from similar subsequences in the current group; and updating the candidate list on the basis whether the candidate list includes a characteristic subsequence matching with the characteristic subsequence of the current group and on the basis of the corresponding counts of occurrences.

The method of the present invention may be executed according to the foregoing principle. When processing data within a first window, initially the candidate list is empty, and at this point each node in the candidate list may be filled with a characteristic subsequence of a group extracted from various subsequences within the first window and a corresponding count of occurrences. After k nodes are filled, the candidate list may be updated on the basis whether the candidate list comprises a characteristic subsequence matching with the characteristic subsequence of the current group. In this embodiment, the principle of update is to ensure the k characteristic subsequences are always those with the greatest counts of occurrences in the at least processed parts of the time series.

In one embodiment of the present invention, those skilled in the art may define a match rule. For example, it may be defined if a distance between a similar subsequence of the current group and a certain characteristic subsequence in the candidate list is no greater than a predefined distance, then it is considered the candidate list includes a characteristic subsequence matching with the characteristic subsequence of the current group; otherwise, it is considered the candidate list does not include a characteristic subsequence matching with the characteristic subsequence of the current group. For example, the predefined distance may be equal to the threshold distance used for the above group division, or the predefined distance may be equal to other value.

In one embodiment of the present invention, the updating the candidate list on the basis whether the candidate list includes a characteristic subsequence matching with the characteristic subsequence of the current group and on the basis of the corresponding counts of occurrences comprises: in response to the candidate list including a characteristic subsequence matching with the characteristic subsequence of the current group, updating the matching characteristic subsequence on the basis of the characteristic subsequence of the current group, and updating the count of occurrences of the matching characteristic subsequence; otherwise, updating the candidate list on the basis of similarity index of the time series and the corresponding counts of occurrences.

When the judgment results in "yes," the candidate list may be updated on the basis of the characteristic subsequence of the current group and the number of similar subsequences in the current group. Specifically, suppose the current group consists of n similar subsequences which are represented as $A_1, \ldots, A_i, \ldots A_n$ respectively, and the matching characteristic subsequence in the candidate list is represented as B and its corresponding count of occurrences equals s, then the updated characteristic subsequence in the candidate list may be represented as $$B'=\frac{B+\sum_{i=1}^{n} A_i/n}{2}.$$

When weights of various similar subsequences are considered, calculation may be performed using an equation $$B'=\frac{B*s+\sum_{i=1}^{n} A_i}{s+n}.$$

Or those skilled in the art may further use other equation on the basis of requirements of a concrete application environment. Moreover, the updated count of occurrences in the candidate list may be represented as s+n.

Description has been presented above to the detailed operation of the branch "yes" by means of a concrete example. Hereinafter, detailed description is presented to the step of the branch "no," i.e., how to update the candidate list on the basis of similarity index of the time series and the corresponding counts of occurrences.

In one embodiment of the present invention, the updating the candidate list on the basis of similarity index of the time series and the corresponding counts of occurrences comprises: in response to determining, on the basis of the similarity index, that a support upper bound of the characteristic subsequence of the current group in the time series is no lower than a minimum value of counts of occurrences of characteristic subsequences in the candidate list, calculating the count of occurrences of the similar subsequence in the current group in the time series; and updating the candidate list in response to the calculated count of occurrences being no less than the minimum value.

Since the present invention relates to the time series, the search efficiency can be increased on the basis of characteristics of the time series. Specifically, the time series typically may comprise similarity index, and the similarity refers to a data structure that is built according to data content or spatial locations of data in the time series, wherein there is comprised profile information of the time series for accelerating search.

A support upper bound in the time series of the characteristic subsequence of the current group can be determined rapidly on the basis of similarity index. When the support upper bound is lower than a minimum value of counts of occurrences of characteristic subsequences in the candidate list, the current group may be discarded directly, and subsequently the flow goes to process the next group; when the support upper bound is equal to or higher than the minimum value of the counts of occurrences, it is indicated the count of occurrences in the time series of a similar subsequence in the group is possibly among the top-k, so further processing is needed.

In one embodiment of the present invention, the updating the candidate list in response to the calculated count of occurrences being no less than the minimum value comprises: updating the candidate list using the characteristic subsequence of the current group and the calculated count of occurrences. When it is determined the count of occurrences in the time series of the characteristic subsequence of the current group is higher than the minimum value of the counts of occurrences of the k characteristic subsequences in the candidate list, the characteristic subsequence of the current group may be updated to a characteristic subsequence field in a node of the candidate list, and the calculated count of occurrences may be updated to a count of occurrences field in the node. Alternatively, the node may replace a node including the minimum value of counts of occurrences in the candidate list. Hereinafter, detailed description is presented to how to obtain a support upper bound on the basis of similarity index and perform subsequent processing.

Generally speaking, the similarity search may be divided into two categories: space-based index and content-based index. With respect to space-based similarity index (like R-tree), its principle lies in mapping time series to points within a space and dividing the points within the space into hierarchies. Statistics may be made on the number of points (i.e., time series) comprised at each hierarchy. During solving a support upper bound, all divisions at a certain hierarchy and possibly including subsequences similar to the characteristic subsequence of the current group can be rapidly located using the space-based index. Numbers of points comprised in these divisions are summated, whereby the support upper bound is obtained.

If the support upper bound is less than the minimum value of counts of occurrences of characteristic subsequences in the candidate list, then it may be decided the count of occurrences of the characteristic subsequence of the current group is not among the top-k; if the support upper bound is greater than or equal to the minimum value, then a next finer-grained hierarchy may be located at the space index, and the support upper bound of the characteristic subsequence of the current group is calculated using the foregoing method, thereby traversing the entire space index as such.

With respect to content-based similarity index (like iSAX), its principle lies in storing a time series in a character string (or symbol sequence) form after discretizing the time series, and building index with respect to the character string using a text index approach. During solving a support upper bound, all subsequences in content index that are similar to the characteristic subsequence of the current group may be rapidly found, and then the number of these subsequences is used as the support upper bound. In addition, some content index can offer the number of similar subsequences or an upper bound of the number without a need to find all similar subsequences. If the support upper bound is less than the minimum value of counts of occurrences of characteristic subsequences in the candidate list, then it may be decided the count of occurrences of the characteristic subsequence of the current group is not among the top-k.

Figure 6:
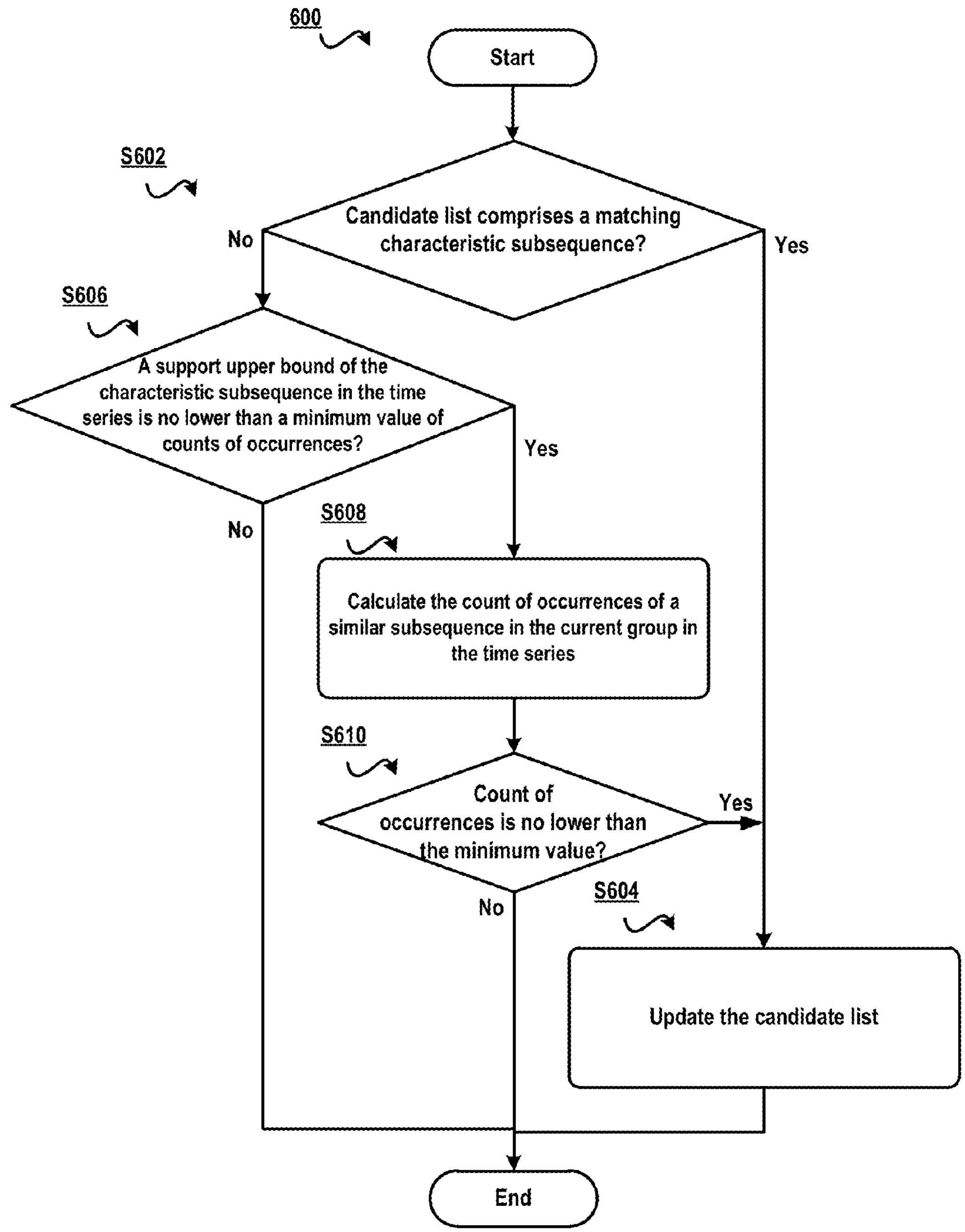
FIG. 6 schematically shows a flowchart of a method for updating the candidate list according to one embodiment of the present invention.

With reference to FIG. 6, illustration is presented below to how to update a candidate list. Specifically, FIG. 6 schematically shows a flowchart 600 of a method for updating a candidate list according to one embodiment of the present invention. In operation S602, it is judged whether or not the candidate list comprises a characteristic subsequence matching with the characteristic subsequence of the current group. If yes, the flow proceeds to operation S604 to update the candidate list. Otherwise, the flow proceeds to operation S606 to further determine whether or not the characteristic subsequence's support upper bound in the time series is less than a minimum value of counts of occurrences in the candidate list. If not, the processing with respect to the current group ends; if yes, the flow proceeds to operation S608 to calculate the actual count of occurrences in the time series of a similar subsequence in the current group, and in operation S610 the actual count of occurrences is compared with the minimum value. If the comparison result in "yes", then the flow proceeds to operation S604 to update the candidate list, otherwise the processing with respect to the current group ends.

Since a high computation workload is needed for operation S608, it is desired to reduce as much as possible the number of times that operation S608 is executed. In the embodiments of the present invention, by comparison at operations S602 and S606, "filtering" can be performed with respect to the current group, thereby reducing the number of times that operation S608 is executed.

Figure 7:
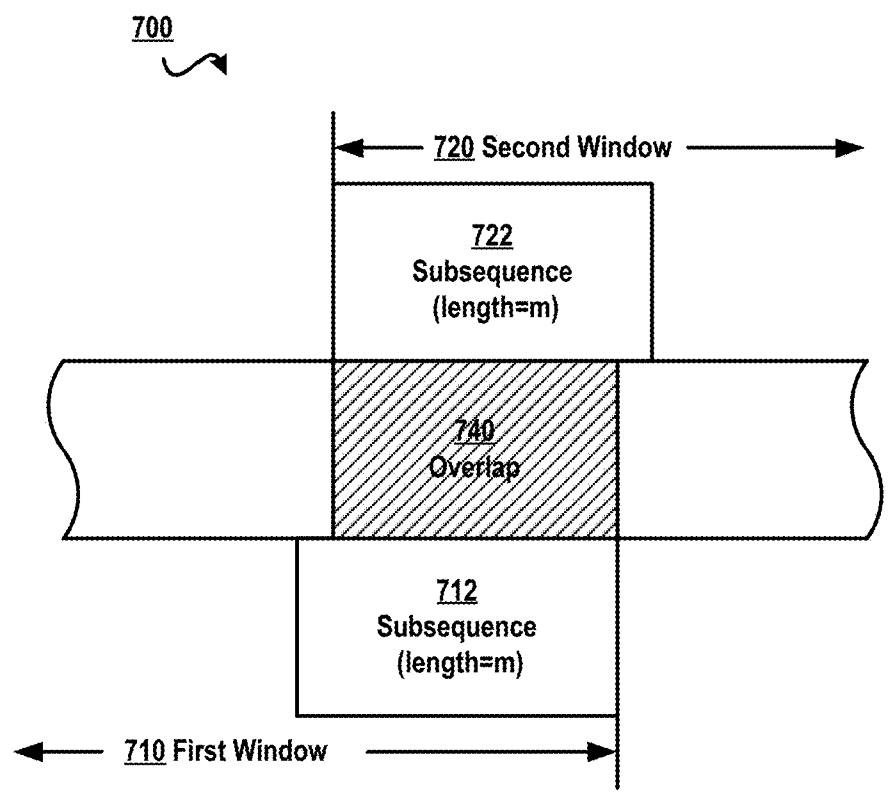
FIG. 7 shows a schematic view of dividing a window according to one embodiment of the present invention.

In one embodiment of the present invention, two adjacent windows among the plurality of windows comprise a part overlapping in time. FIG. 7 shows a schematic view 700 of dividing a window according to one embodiment of the present invention. As shown in FIG. 7, a first window 710 and a second window 720 comprise an overlap 740, so that the last subsequence 712 (length=m) within first window 710 and the first subsequence 722 (length=m) within second window 720 are two consecutive subsequences in the entire time series. In one embodiment of the present invention, the length of the overlapping part may be equal to m−1. Or when other step size is used to extract subsequences, the overlapping part may further have other length.

In one embodiment of the present invention, the method is periodically executed as the time series is updated. The present invention may be applied in offline mode and also online mode. In online mode, the to-be-processed time series may vary in real time, and so the method of the present invention is periodically executed as the time series is updated, so as to continuously update the candidate list on the basis of current data.

In one embodiment of the present invention, there is provided a method for searching in a time series, comprising: in response to receiving a search request, returning a candidate list as a search result, wherein the candidate list is a candidate list in the method of the present invention. As detailed description has been presented to how to maintain the candidate list with respect to the time series, in one embodiment of the present invention, search may further be conducted with respect to the time series on the basis of the candidate list. For example, in response to a user's search request, k motifs with greatest counts of occurrences in the time series may be returned rapidly (i.e., k characteristic subsequences in the candidate list).

Various embodiments implementing the method of the present invention have been described above with reference to the accompanying drawings. Those skilled in the art may understand that the method may be implemented in software, hardware or a combination of software and hardware. Moreover, those skilled in the art may understand by implementing operations in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding operations. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8:
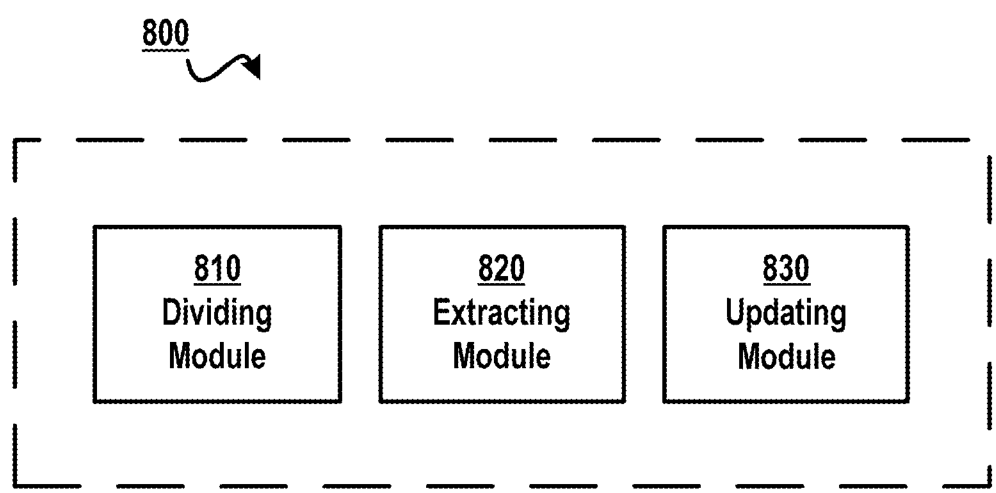
FIG. 8 schematically shows a block diagram of an apparatus for processing a time series according to one embodiment of the present invention.

FIG. 8 shows a block diagram 800 of an apparatus for processing a time series according to one embodiment of the present invention. As shown in FIG. 8, there is shown an apparatus for processing a time series, comprising: a dividing module 810 configured to divide the time series into a plurality of windows by time, an extracting module 820 configured to process a current window among the plurality of windows as below: extracting at least one group of similar subsequences from the current window; and an updating module 830 configured to update a candidate list on the basis of comparison between similar subsequences in each group of the at least one group with k characteristic subsequences in the candidate list, wherein the k characteristic subsequences are k characteristic subsequences with a greatest number of occurrences in at least processed parts of the time series.

In one embodiment of the present invention, extracting module 820 comprises: an adding module configured to add two similar subsequences to the same group in response to a distance between the two similar subsequences being no greater than a threshold distance.

In one embodiment, the distance is calculated on the basis of a difference in data at corresponding time points of the two similar subsequences.

In one embodiment of the present invention, the candidate list further comprises corresponding counts of occurrences of the k characteristic subsequences, and updating module 830 includes a candidate list updating module configured to update the candidate list on the basis of the comparison and the corresponding counts of occurrences.

In one embodiment of the present invention, the candidate list updating module includes a characteristic extracting module configured to, with respect to a current group of the at least one group, extract a characteristic subsequence of the current group from similar subsequences in the current group; and a list updating module configured to update the candidate list on the basis whether the candidate list includes a characteristic subsequence matching with the characteristic subsequence of the current group and on the basis of the corresponding counts of occurrences.

In one embodiment of the present invention, the list updating module comprises: a first updating module configured to, in response to the candidate list including a characteristic subsequence matching with the characteristic subsequence of the current group, update the matching characteristic subsequence on the basis of the characteristic subsequence of the current group, and update the count of occurrences of the matching characteristic subsequence; and a second updating module configured to update the candidate list on the basis of similarity index of the time series and the corresponding counts of occurrences.

In one embodiment of the present invention, the second updating module comprises: a calculating module configured to, in response to determining, on the basis of the similarity index, that a support upper bound of the characteristic subsequence of the current group in the time series is no less than a minimum value of the count of occurrences of a characteristic subsequence in the candidate list, calculate the count of occurrences of the similar subsequence in the current group in the time series; and a third updating module configured to update the candidate list in response to the calculated count of occurrences being no less than the minimum value.

In one embodiment of the present invention, the third updating module comprises: a fourth updating module configured to update the characteristic subsequence and the counts of occurrences in the candidate list by using the characteristic subsequence of the current group and the calculated count of occurrences.

In one embodiment of the present invention, two adjacent windows among the plurality of windows comprise a part overlapping in time.

In one embodiment of the present invention, the apparatus is periodically invoked as the time series is updated.

In one embodiment of the present invention, there is provided an apparatus for searching in a time series, including a searching module configured to, in response to receiving a search request, return a candidate list as a search result, wherein the candidate list is a candidate list in the apparatus of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for processing a time series, comprising:

a dividing module configured to divide the time series into a plurality of windows by time;

an extracting module configured to process a current window among the plurality of windows by extracting at least one group of similar subsequences from the current window; and an updating module configured to update a candidate list on the basis of comparison between similar subsequences in each group of the at least one group with k characteristic subsequences in the candidate list;

wherein the k characteristic subsequences are k characteristic subsequences with a greatest number of occurrences in at least processed parts of the time series, wherein k characteristic subsequences are based on averaging the similar subsequences in each group, wherein two adjacent windows among the plurality of windows comprise a part overlapping in time, wherein the candidate list further comprises corresponding counts of occurrences of the k characteristic subsequences, and wherein the updating module comprises:

a candidate list updating module configured to update the candidate list on the basis of the comparison and the corresponding counts of occurrences, wherein the candidate list updating module comprises:

a characteristic extracting module configured to, with respect to a current group of the at least group, extract a characteristic subsequence of the current group from similar subsequences in the current group; and a list updating module configured to update the candidate list on the basis whether the candidate list includes a characteristic subsequence matching with the characteristic subsequence of the current group and on the basis of the corresponding counts of occurrences.

2. The apparatus of claim 1, wherein the extracting module comprises an adding module configured to add two similar subsequences to the same group in response to a distance between the two similar subsequences being no greater than a threshold distance.

3. The apparatus of claim 2, wherein the distance is calculated on the basis of a difference in data at corresponding time points of the two similar subsequences.

4. The apparatus of claim 1, wherein the list updating module comprises:

a first updating module configured to, in response to the candidate list including a characteristic subsequence matching with the characteristic subsequence of the current group, update the matching characteristic subsequence on the basis of the characteristic subsequence of the current group, and updating the count of occurrences of the matching characteristic subsequence; and a second updating module configured to update the candidate list on the basis of similarity index of the time series and the corresponding counts of occurrences.

5. The apparatus of claim 4, wherein the second updating module comprises:

a calculating module configured to, in response to determining, on the basis of the similarity index, that a support upper bound of the characteristic subsequence of the current group in the time series is no less than a minimum value of the count of occurrences of a characteristic subsequence in the candidate list, calculate the count of occurrences of the similar subsequence in the current group in the time series; and a third updating module configured to update the candidate list in response to the calculated count of occurrences being no less than the minimum value.

6. The apparatus of claim 5, wherein the third updating module comprises a fourth updating module configured to update the characteristic subsequence and the counts of occurrences in the candidate list by using the characteristic subsequence of the current group and the calculated count of occurrences.

7. The apparatus of claim 1, wherein the apparatus is periodically invoked as the time series is updated.

8. An apparatus for searching in a time series, comprising a searching module configured to, in response to receiving a search request, return a candidate list as a search result, wherein the candidate list is a candidate list in an apparatus of claim 1.

* * * * *